United States Patent [19]

Shenk

[11] 4,309,098

[45] Jan. 5, 1982

[54] AUTOFOCUS CINE CAMERA HAVING AUTOMATIC VARIABLE SPEED FOCUSING

[75] Inventor: Edwin K. Shenk, Westford, Mass.

[73] Assignee: Polaroid Corporation, Cambridge, Mass.

[21] Appl. No.: 137,635

[22] Filed: Apr. 7, 1980

Related U.S. Application Data

[63] Continuation-in-part of Ser. No. 965,405, Dec. 1, 1978, abandoned.

[51] Int. Cl.³ .............................................. G03B 3/10
[52] U.S. Cl. .................................... 354/195; 352/140
[58] Field of Search .......................... 354/25, 195, 163; 352/140; 250/201, 234; 355/55, 56; 358/227; 318/313, 480, 640, 310, 601, 611, 268; 350/46; 353/101

[56] References Cited

U.S. PATENT DOCUMENTS

| | | | |
|---|---|---|---|
| 3,522,981 | 8/1970 | Kirstein et al. | 354/195 X |
| 3,839,664 | 10/1974 | Dirks et al. | 318/640 X |
| 3,927,414 | 12/1975 | Moriyama et al. | 354/195 |
| 3,936,187 | 2/1976 | Momose | 354/25 |
| 3,949,287 | 4/1976 | Wagonsonner et al. | 318/640 |
| 3,963,970 | 6/1976 | Satake | 318/640 |
| 3,972,607 | 8/1976 | Reider | 353/101 |
| 4,002,405 | 1/1977 | Stahl | 354/195 X |
| 4,066,347 | 1/1978 | Wagensonner | 352/141 |
| 4,103,152 | 7/1978 | Stauffer | 250/201 X |
| 4,178,087 | 12/1979 | Shenk et al. | 354/195 |

Primary Examiner—L. T. Hix
Assistant Examiner—William B. Perkey
Attorney, Agent, or Firm—John J. Kelleher

[57] ABSTRACT

A photographic camera having an adjustable focus lens is provided with an automatic focus control system to focus said lens at one focusing rate if the lens focusing movement necessary to focus said lens to the proper subject-in-focus position is greater than a predetermined magnitude, and at another focusing rate if said necessary lens focusing movement is equal to or less than said predetermined magnitude.

14 Claims, 4 Drawing Figures

AUTOFOCUS CINE CAMERA HAVING AUTOMATIC VARIABLE SPEED FOCUSING

CROSS REFERENCE TO RELATED APPLICATION

This is a continuation-in-part of application Ser. No. 965,405, filed Dec. 1, 1978, now abandoned.

BACKGROUND OF THE INVENTION

1. Field of the Invention

The present invention relates to a photographic camera having an automatically focused adjustable focus lens in general, and to an automatically focused motion picture camera, in particular.

2. Description of the Prior Art

Control systems for automatically positioning the movable element of an adjustable focus lens that is adjustable over a given operational range to a desired focus position within said operational range in order to properly focus an image of a remote object at the image plane of a photographic camera in response to a signal representative of the distance to said remote object, have been disclosed in the prior art. A camera having such a focus control system that utilizes acoustical energy to derive a signal representative of the distance to said remote object is described in my copending application Ser. No. 965,404, filed Dec. 1, 1978.

In an adjustable focus lens autofocusing motion picture camera having a focus control system of the type mentioned above that is adjustable over a given operational range, the focus control system positions the movable element of said lens to the proper focus position from a previous focus position within said range in accordance with a rangefinder derived subject distance signal. If the desired focus position is relatively close to the preceeding focus position, the amount of time required to position the movable element of said adjustable focus lens to the desired focus position is relatively small. However, once the focusing distance between the preceeding focus position and the desired focus position exceeds a predetermined magnitude, the amount of focusing time required becomes excessive in that a subject remains out of focus for a length of time that tends to be objectionable to, for example, one who subsequently views a motion picture that has been produced with this type of adjustable focus lens focusing system.

One approach to reducing the time required for an adjustable focus lens to be automatically focused on a subject to be photographed would be to increase the focusing speed of the drive means that focuses said lens. A reduction in focusing time would be achieved by such an approach. However, subjects that require relatively small amounts of lens focusing movement would come into focus too rapidly to provide the desired smooth transition between an out-of-focus and an in-focus subject image.

SUMMARY OF THE INVENTION

In accordance with the teachings of the present invention, an autofocusing motion picture camera having an adjustable focus lens that is adjustable over a given operational range is provided with a focus control system that positions the movable element of said adjustable focus lens to a desired focus position to focus an image of a remote object at the image plane of said camera at a first rate of speed in accordance with a rangefinder derived signal representative of the distance to said remote object if the required lens element focusing movement is less than or equal to a predetermined magnitude and at another rate of speed if said required lens focusing movement exceeds said predetermined magnitude.

DESCRIPTION OF THE PREFERRED EMBODIMENT

Figure 1:
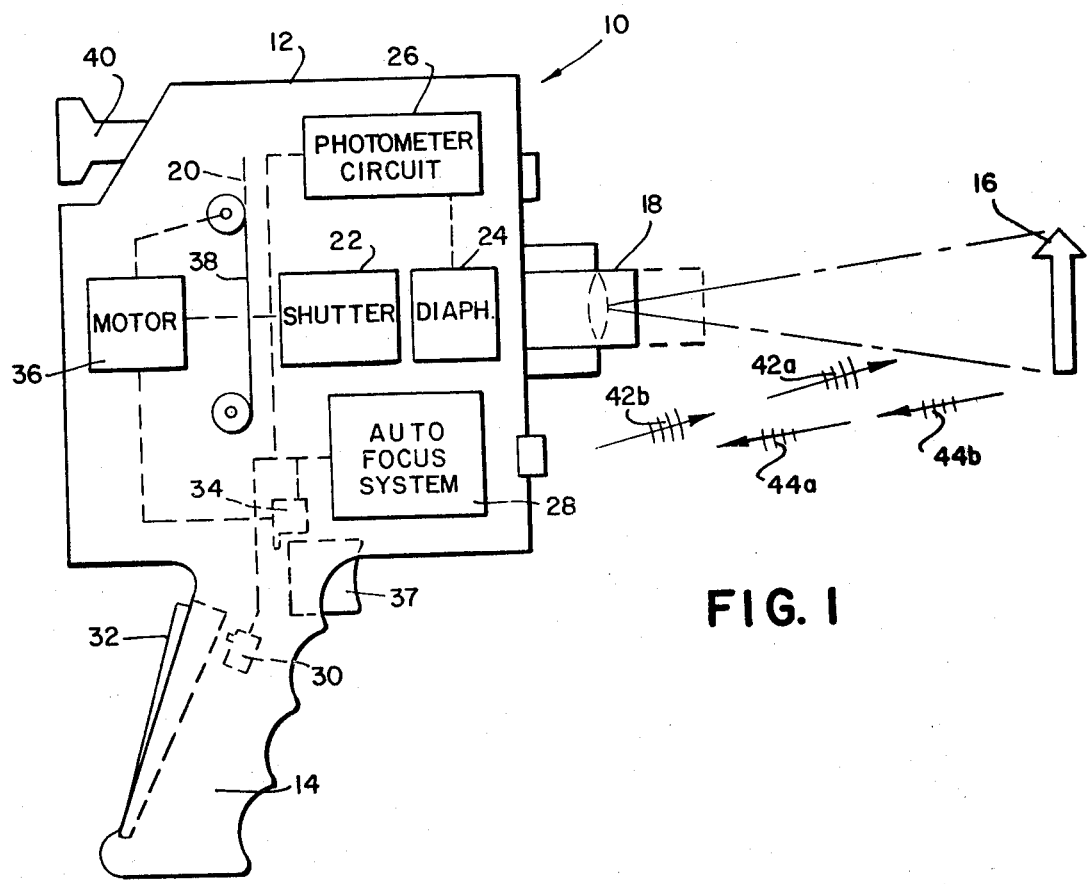
FIG. 1 is a side view, in elevation, of an adjustable focus lens, automatic focusing motion picture camera incorporating the inventive concept of the present invention.

Referring now to the drawings and, specifically, to FIG. 1, a schematic diagram of automatic focusing camera 10 constructed in accordance with a preferred embodiment of the present invention, is depicted. Camera 10 comprises a housing 12 having handle 14 projecting from the bottom thereof by which a user holds said camera 10 to photograph subject 16 through adjustable focus lens mount 18 which directs scene light to image plane 20 when shutter mechanism 22 is operated. Diaphragm 24 associated with shutter mechanism 22, in conjunction with lens mount 18, establishes the instantaneous amount of light incident on image plane 20. The opening of diaphragm 24 is controlled by photometer circuit 26 in response to available scene light.

Mounted within said housing 12 is automatic focusing system 28 which, when activated, is responsive to the distance to subject 16 from camera 10, and to changes in said distance for adjusting the focus position of lens mount 18 in order to maintain an image of subject 16 in focus at image plane 20. Switch 30, which is mounted in camera handle 14 and is connected to an energy source (not shown), controls the operation of photometer circuit 26 and automatic focus system 28 in response to a minimum amount of pivotal movement of actuator 32 as the handle 14 is engaged by the heel of a user's hand when holding camera 10 in position to record a scene. Additionally, switch 30 couples said energy source (battery) to motor run switch 34 to permit scene recording as explained below.

Housing 12 also contains motor 36 which, when energized through motor run switch 34 by depressing trigger 37, simultaneously operates shutter 22 and a film indexing claw (not shown) which intermittently drives film 38 past an image recording station located behind shutter 22. Finally, a viewfinder 40 is provided to enable a camera user to frame the scene being filmed.

In the operation of camera 10, the user grasps handle 14 and frames subject 16 by means of viewfinder 40. As the user holds handle 14, switch 30 is closed by the pivotal movement of actuator 32, thereby powering photometer circuit 26 and autofocus system 28. Photometer circuit 26 establishes the proper diaphragm opening in accordance with the amount of light in the scene being photographed while autofocus system 28 ultrasonically determines the distance to subject 16 and then focuses adjustable focus lens mount 18 such that the lens system in said lens mount 18 focuses an in-focus image of subject 16 at image plane 20 when shutter 22 is activated to the open position. The distance to subject 16 is determined by measuring the time it takes for an ultrasonic burst of energy to travel from autofocus system 28 to subject 16 and to be reflected back to said autofocus system 28 from said subject 16. Reference numerals 42a and 42b designate sequential ultrasonic bursts of energy being transmitted toward subject 16 and reference numerals 44a and 44b designate the reflection of these ultrasonic bursts of energy from subject 16 toward autofocus system 28. In this particular ultrasonic focusing system, an ultrasonic burst of energy is transmitted and an echo of said transmitted burst of ultrasonic energy is received before a subsequent burst of range determining ultrasonic energy is transmitted. The ultrasonic rangefinder portion of autofocus system 28 is described in greater detail in my copending U.S. patent application Ser. No. 916,114, now U.S. Pat. No. 4,199,244.

As discussed above, autofocus system 28 determines the time interval between the transmission of an ultrasonic burst of energy 42a and the return of its echo 44a for the purpose of determining the distance of subject 16 from camera 10. Having established this distance, autofocus system 28, when permitted to do so, moves lens mount 18 toward a focus position in which an image of subject 16 will be in focus at focal plane 20 when shutter 22 is activated. As briefly mentioned above, activation of shutter 22 is selectively carried out when the user depresses trigger 37, thereby closing switch 34 and powering motor 36. Autofocus system 28 remains in operation so long as the user maintains his grasp of the handle 14 and is effective to continuously determine subject range and to cause lens mount 18 to track changes in subject distance both prior to and during filming.

Figure 2:
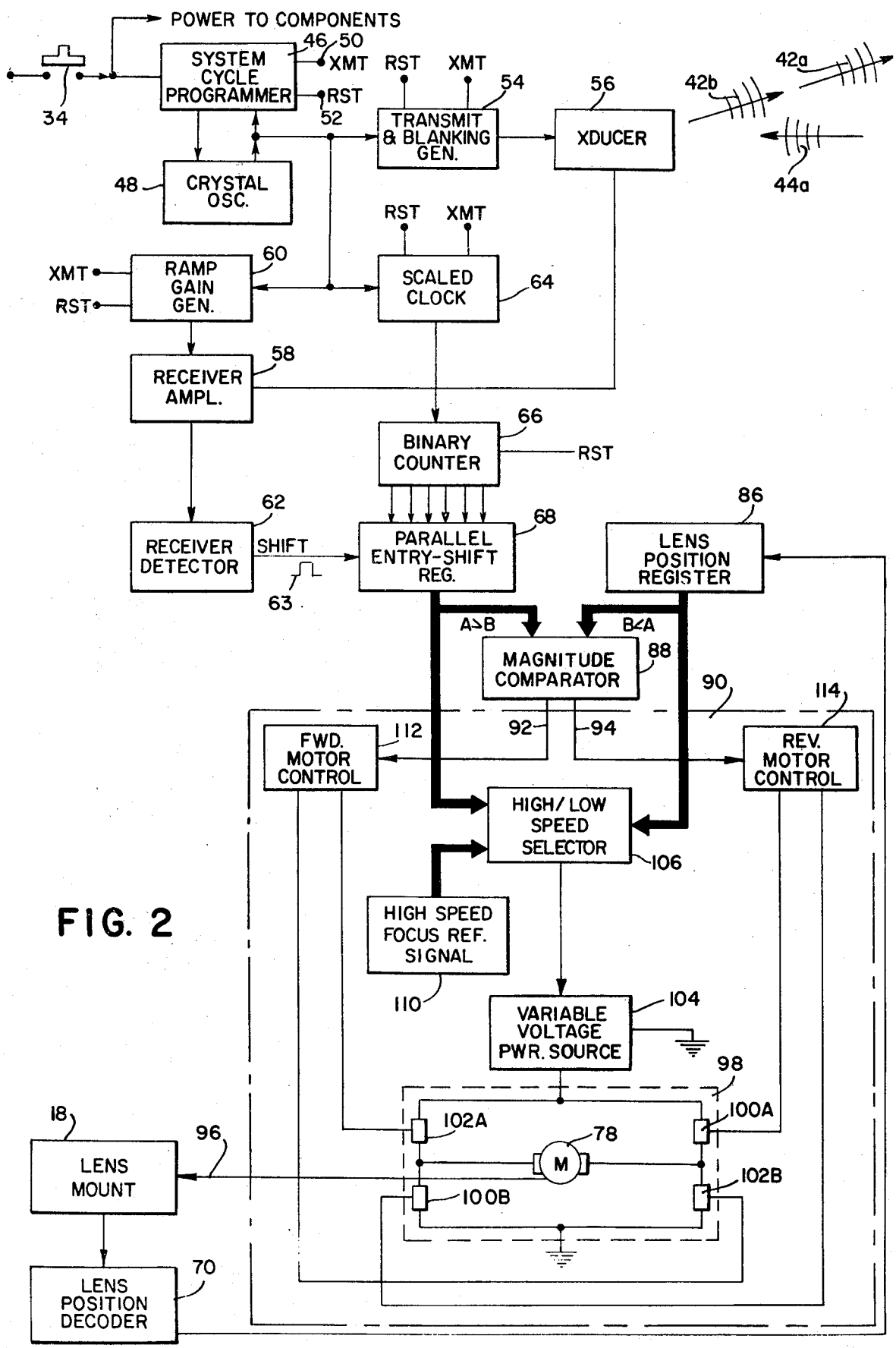
FIG. 2 is a block diagram of the adjustable focus lens autofocus system schematically depicted in FIG. 1.

Certain details of autofocus system 28 are shown in FIG. 2, to which reference is now made. When switch 34 is closed, power is applied to the components of autofocus system 28 (FIG. 1) which causes system cycle programmer 46 to divide-down the high frequency output of oscillator 48 into a transmit and reset pulse train having the same pulse repetition frequency, but shifted in phase. Each pulse of the transmit pulse train produced at output 50 is designated XMT. The reset pulse train produced at output 52, and designated RST, is the same as the XMT pulse train but is delayed with respect to the XMT pulses by about 65 ms, which is greater than the round trip time for sonic energy, under normal conditions of temperature and pressure, for subjects at a distance of about 24 feet from camera 10 (FIG. 1) which represents the hyperfocal lens position of the lens system mounted in lens mount 18 (FIG. 1). This arrangement will allow any echo from a subject within 24 feet of said camera to be received by autofocus system 28 in the time interval between successive RST pulses.

Transmit and blanking generator 54, to which the XMT pulses and the output of oscillator 48 are applied, operate similar to the corresponding component in the ultrasonic ranging system disclosed in copending application Ser. No. 840,802, filed Nov. 11, 1977, now abandoned in the name of JUERG MUGGLI, which causes transducer 56 to transmit periodic ultrasonic bursts of energy, two of which are illustrated at 42a and 42b. An echo from a subject due to ultrasonic burst of energy 42a, indicated at 44a, is received by transducer 56 where the echo, in the form of an electrical signal, is routed to receiver amplifier 58 in the manner described in the aforementioned MUGGLI application. Amplifier 58 has a ramp gain characteristic controlled by ramp gain generator 60 to increase the sensitivity of autofocus system 28 (FIG. 1) to distant subjects. The output of amplifier 58 is detected by receiver detector 62 to produce an echo pulse 63 such that the time between a transmit pulse and its associated echo pulse is proportional to the distance between a subject and camera 10.

This above-noted time interval is utilized in conjunction with scaled clock 64 to establish a number representative of the desired focus position for lens mount 18. The output of scaled clock 64 is a train of pulses whose pulse repetition frequency varies with time in accordance with the derivative of the lens/subject function of the lens system associated with lens mount 18. This lens/subject function is graphically depicted in FIG. 4. With continued reference to FIG. 2, the output of scaled clock 64 is integrated by accumulating the pulses produced by said scaled clock, in binary counter 66; the contents of counter 66 at any instant in time represents the integral of the time derivative of the lens/subject function evaluated from the time of transmit pulse XMT to said instant in time. Consequently, the contents of counter 66, when echo pulse 63 occurs, is a definite interval of a time derivative of the lens/subject function of the lens system associated with lens mount 18, which is a number representing the desired focus position of said lens mount 18 for a subject whose distance is determined by the time interval between transmit pulse XMT and echo pulse 63.

By means of receiver detector 62, echo pulse 63 triggers parallel entry/shift register 68 causing the shifting of the contents of counter 66, at the instant of echo pulse 63, into said shift register 68. Shortly after echo pulse 63 occurs, reset pulse RST appears at output 52 of system cycle programmer 46 thereby resetting scaled clock 64, binary counter 66, ramp gain generator 60 and transmit and blanking generator 54. The condition of autofocus system 28 is now such that upon the generation of the next ultrasonic burst of energy in response to the next transmit pulse XMT from system cycle programmer 46, the cycle of operation described above will be repeated so that, upon the generation of the next echo pulse 63, the contents of counter 66 will again be shifted into register 68. As a consequence, the number in register 68 repeatedly varies in response to changes in subject distance at a rate dependent upon the pulse repetition rate of transmit pulse XMT.

Figure 3:
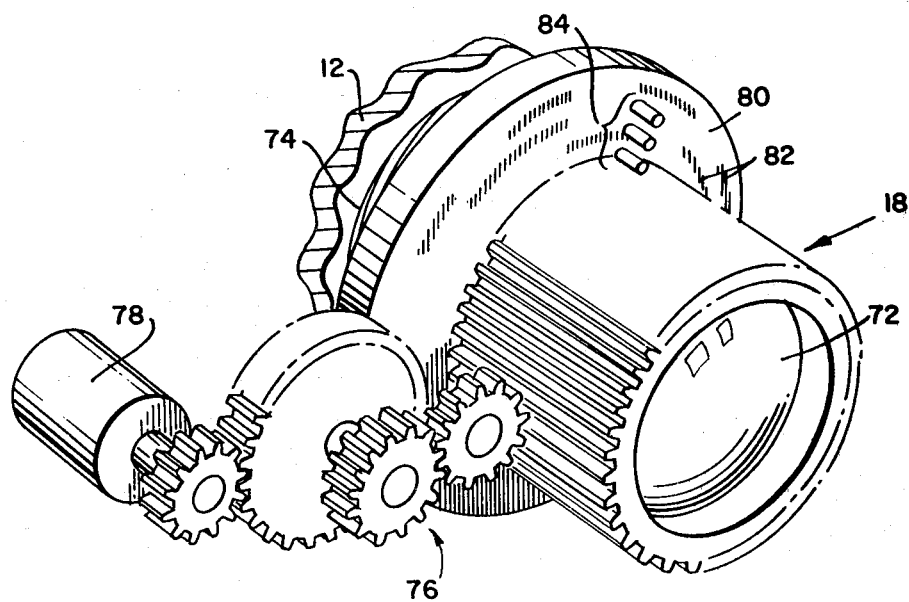
FIG. 3 is a perspective view of a portion of the drive means lens position decoder for the adjustable focus lens depicted in FIG. 1.

For determining the actual position of lens mount 18, lens position decoder 70 is provided and is described in detail with respect to FIG. 3. Reference is now made to FIG. 3 which shows the preferred form of lens position decoder 70. As shown in FIG. 3, lens mount 18 carrying objective lens 72 is rotatably mounted on threaded member 74 carried by the camera housing 12 so that rotational movement of lens mount 18 causes axial displacement of objective lens 72. Actually, the pitch of threaded member 74 is selected such that considerably less than 360° is required to displace lens 72 from its extreme close-up axial position to its infinity or hyperfocal axial position. In order to rotate lens mount 18, a gear train 76 is interposed between the motor 78 and the gear teeth carried by the periphery of lens mount 18. A slip clutch connection (not shown) is interposed between motor 78 and lens mount 18 to permit overrunning of the motor 78 in the event of a jam or engagement of the lens mount with an axial movement limiting stop at either end of lens mount travel. Projecting from and rotatable with lens mount 18 is encoder disc 80, carrying shaft encoding indicia 82 in the form of binary coded slots that pass completely through said disc 80. Encoding indicia 82 are preferably in the form of a gray code. However, for ease of description, a standard three-bit binary code is utilized. Operatively associated with indicia 82 are three photocells 84 and three light sources (not shown). The light path between a light source and its associated photocell is blocked and unblocked by slotted encoder disc 80 as said disc is rotated through said light path. The output of each photocell provides one bit of information on the angular and therefore the axial position of lens mount 18.

Turning again to FIG. 2, the output of lens position decoder 70 is applied to lens position register 86 which constitutes means responsive to the position of said lens mount 18 for generating a number representative of the actual position of said lens mount. Continuing now with the operation of the embodiment of FIG. 2, parallel entry/shift register 68 is a first register of autofocus system 28 (FIG. 1) and stores a number representative of the desired focus position for lens mount 18, the contents of this first register varying in response to changes in subject distance at a rate dependent upon the pulse repetition rate of the transmit pulses as previously discussed. Lens position register 86 constitutes a second register of autofocus system 28 which stores a number representative of the actual position of lens mount 18, the contents of register 86 varying in response to changes in lens mount 18 position at a rate determined by the rate of change of lens mount 18 position. The rate of change of the contents of register 86 is thus independent of the rate at which the contents of register 68 are updated.

The contents of registers 68 and 86 are compared in magnitude comparator 88 to determine, on a continuous basis, which register contains the larger number. Since each register number is based on the same reference (i.e., the desired focus position and the actual lens position are measured from the same reference point), the contents of the registers will be equal when the actual position of lens mount 18 corresponds to the desired position for said lens mount 18. When the contents of one register exceeds the contents of the other, the actual position of lens mount 18 will be displaced from its last focused position by an amount equal to the difference between the contents of each such register. Whether the actual position of lens mount 18 is on one side or the other of the desired focus position will depend upon which register contains the larger number. With knowledge of the existance of a difference in contents as well as identification of the register with the larger number, drive means 90 is responsive to the output of magnitude comparator 88, causing lens mount 18 to track changes in subject distance.

Comparator 88 has first and second output terminals 92 and 94. A signal appears on first terminal 92 only when the number in first register 68 exceeds the number in second register 86. If the numbers in the registers are designated A and B, then a signal will appear on terminal 92 when A is greater than B. Ordinarily, a signal will appear on second terminal 94 only when the reverse relationship between the magnitudes occurs, namely, B greater than A.

Drive means 90 includes variable speed, reversible drive motor 78 operatively associated with lens mount 18 through mechanical connection 96, bridge-type switching circuit 98 that includes transistor switches 100a, 100b, 102a and 102b, for connecting drive motor 78 to variable voltage power source 104, high/low speed selector 106, high speed reference signal 110, a forward motor control 112 and a reverse motor control 114.

Forward motor control 112 is responsive to a signal on first terminal 92 for operating motor 78 in one direction to thereby move lens mount 18 in said direction so as to increase the number in register 86 and thereby tend to null the signal on terminal 92. Similarly, a signal on second terminal 94 causes reverse drive motor control 114 to operate motor 78 in the opposite direction, thereby moving the lens mount in the opposite direction to thereby decrease the number in register 86. This particular movement should tend to nullify the signal on terminal 94 if the subject remains stationary. Whether or not a null condition is actually reached depends upon what is concurrently happening to the contents of register 68. This, of course, depends upon changes in subject distance. When no signal appears on either terminal 92 or terminal 94, neither control 112 nor 114 are operated and motor 78 remains stationary. As indicated above, this condition exists when the actual and desired focus positions for lens mount 18 are the same.

Forward motor control 112 causes motor 78 to rotate in the forward direction by causing transistor switches 102a and 102b to be closed during the same interval of time. Similarly, reverse motor control 114 causes said motor 78 to rotate in the reverse direction by causing transistor switches 100a and 100b to be closed during the same interval of time.

When either motor controls 112 or 114 cause motor 78 to operate in one direction or the other, the rate of speed at which said motor 78 rotates is primarily determined by the magnitude of the voltage that is supplied to motor 78 by variable voltage power source 104, a voltage that can be varied between either of two possible levels. The actual voltage output level of variable voltage power source 104 is determined by comparing the difference in magnitude between digital signals appearing at the output of registers 68 and 86 which are in the form of streams of binary bits, said difference signal being the lens position error signal, with high speed focus reference signal 110, a comparison that is made within high/low speed selector 106 by utilizing conventional digital techniques. Once this comparison is made, the output from high/low speed selector 106 is routed to variable voltage power source 104 to select the appropriate voltage level so that motor 78 can be driven at the appropriate rate of speed. If the magnitude of the lens position error signal, which is the difference in magnitude between the digital signals appearing at the output of registers 68 and 86, is less than the magnitude of high speed focus reference signal 110, a low voltage level in variable voltage power source 104 will be selected by high/low speed selector 106 and therefore when motor 78 is operated in either direction by motor controls 112 or 114, motor 78 will rotate at a low or normal rate of speed. However, if the magnitude of the lens position error signal exceeds the magnitude of high speed focus reference signal 110, a high voltage level in variable voltage power source 104 will be selected by high/low speed selector 106 and therefore when motor 78 is operated in either direction by motor controls 112 or 114, motor 78 will rotate at a relatively high rate of speed.

Figure 4:
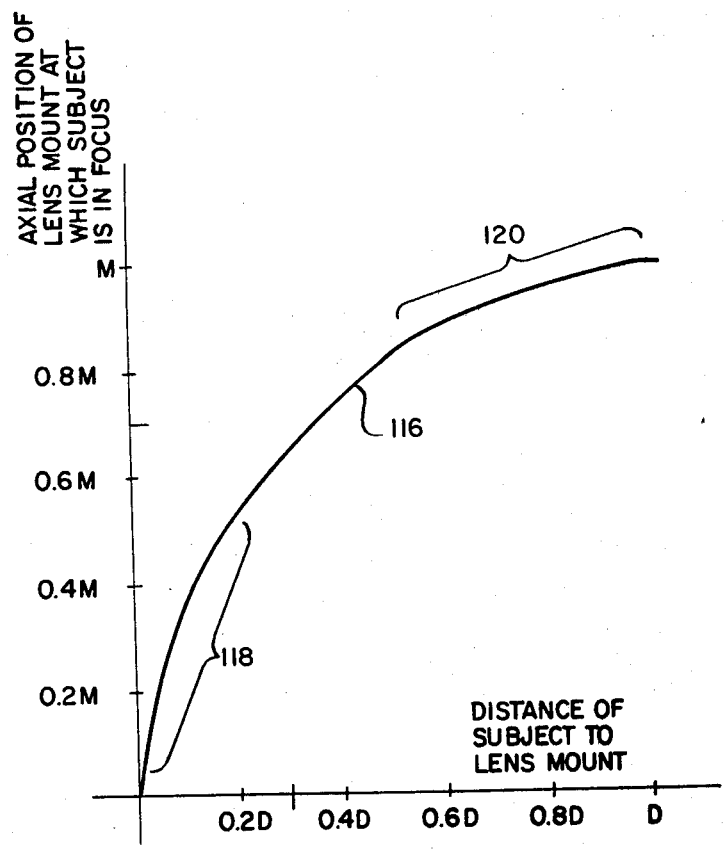
FIG. 4 is a graph showing a typical lens/subject function of a motion picture camera of the type depicted in FIG. 1.

From the foregoing discussion, it can be seen that whether or not motor 78 rotates at a high or a low rate of speed to focus lens mount 18 is primarily dependent upon the magnitude of high speed focus reference signal 110. The desired magnitude for this signal is empirically determined by considering the graph of the lens/subject function of the adjustable focus lens of camera 10 (FIG. 1) that is depicted in FIG. 4. Referring now to FIG. 4, curve 116 shows the axial position of lens mount 18 at which a subject to be photographed is in focus as a function of the distance to said subject from said lens mount. As curve 116 clearly illustrates, in region 118 for example, considerably more lens angular or focusing movement is required between focus positions to bring an image of a near object into focus than is required between similar focus positions in region 120 of curve 116 for more distant objects. As a consequence of this nonlinear relationship, with the same lens focusing speed, it takes a longer period of time to rotate or focus lens mount 18 between focus positions if its axial position is within, for example, region 118 than it does to focus lens mount 18 between equivalent focus positions if said lens mount is within, for example, region 120. The effect of this difference in focusing time, which is dependent upon the particular region of curve 116 within which lens mount 18 focusing occurs, is that in at least some lens/subject function regions, the required lens focusing time becomes excessive in that a subject remains out of focus for a period of time that tends to be visually objectionable to, for example, one who subsequently views a motion picture that has been produced with this type of adjustable focus lens focusing.

In any adjustable focus lens system, there is a range of necessary focusing movement within which a particular subject image is in varying degrees of relatively clear focus, and a range of lens focusing movement within which said subject image is in varying degrees of blurredness. I have determined that if the extent of required lens focusing movement is greater than a one-eighth portion of the entire focusing range of an adjustable focus lens system, the lens can be focused at a relatively rapid rate of speed when compared with its normal focusing rate without making a motion picture film (for example) that has been produced with a rapidly focused lens system visually unpleasant or startling to a subsequent film viewer. This is so because when the movable element of the lens system is moved through that portion of its focusing range outside of said one-eighth focusing range portion for the purpose of focusing a subject image at an image plane, the image formed at said image plane while said movable lens element is beyond said one-eighth focusing range portion will be blurred. This blurred condition will, in effect, mask the relatively rapid lens focusing movement that would otherwise be startling and/or visually objectionable to one viewing the unmasked effects of such rapid lens focusing. By focusing the lens system at a rapid rate of speed when the extent of required lens focusing movement is greater than a one-eighth portion of the entire lens system focusing range, the time required to focus an image of a subject to be photographed at an image plane, for example, is substantially reduced. It has been determined that optimum lens focusing for the two-speed focusing system described herein occurs when the rate of rapid focusing movement is twice the rate of normal lens focusing movement.

In the focus control system of the present invention, the above-mentioned problem of excessive focusing time is avoided by providing a variable speed focus control system that focuses lens mount 18 at at low or normal rate of speed if the required lens focusing movement is less than or equal to a predetermined magnitude, and at a greater rate of speed if said required lens focusing movement exceeds said predetermined magnitude. This predetermined magnitude is equal to said one-eighth portion of said entire lens system focusing range. An electrical signal is provided that corresponds to the magnitude of said one-eighth focusing portion. This electrical signal is referred to and depicted as high speed focus reference signal 110 in FIG. 2.

With reference to FIG. 2 and as explained above, so long as the difference in magnitude between the signals appearing at the output at registers 68 and 86 remains less than or equal to said high speed focus reference signal 110, variable voltage power source 104 will provide a relatively low voltage for the purpose of focusing lens mount 18 at a low or normal rate of speed. A higher voltage will be provided by variable voltage power source 104 for the purpose of focusing lens mount 18 at a high rate of speed whenever the magnitude of the lens position error signal, which is the difference in magnitude between the digital signals appearing at the output of registers 68 and 86, exceeds high speed focus reference signal 110. If lens mount 18 is initially being rotated or focused at a high rate of speed, the rotation or angular focusing speed will be reduced to the lower or normal rate of speed as soon as the remaining focusing movement required to focus lens mount 18 is reduced to the predetermined magnitude that corresponds to high speed focus reference signal 110.

It will be apparent to those skilled in the art from the foregoing description of my invention that various improvements and modifications can be made in it without departing from its true scope. The embodiment described herein is merely illustrative and should not be viewed as the only embodiment that might encompass my invention.

What is claimed is:

1. In an autofocusing camera of the type having,
   an image plane,
   an adjustable focus lens mounted for displacement over a given operational range where it serves to focus images of subjects positioned within a range of subject distances at said image plane,
   an ultrasonic rangefinder for deriving a subject distance signal representative of the distance to a particular subject within said range of subject distances, the improvement comprising:
   energizable drive means responsive to said subject distance signal for displacing said lens at one rate in a particular direction if the magnitude of lens displacement necessary to focus an image of said particular subject at said image plane is greater than one-eighth of the entire focusing range of said adjustable focus lens and at another rate in said same particular direction if said necessary lens displacement magnitude is equal to or less than said one-eighth of the entire focusing range of said adjustable focus lens.

2. The apparatus of claim 1, wherein said lens is displaced at a greater rate of speed to a desired focus position if said magnitude of necessary lens displacement is greater than said predetermined magnitude than it is displaced when said magnitude of necessary displacement is equal to or less than said predetermined magnitude.

3. The apparatus of claim 2, wherein said greater rate of speed is twice that of the other rate of speed.

4. The apparatus of claim 1, wherein said energizable drive means includes a reversible variable speed motor for displacing said lens to a desired focus position.

5. The apparatus of claim 4, wherein said reversible variable speed motor is of the direct current type.

6. The apparatus of claim 5, wherein said drive means includes a variable voltage power supply whose output voltage is variable between two voltage levels, the particular voltage level being dependent upon the magnitude of lens displacement necessary to focus an image of said particular subject at said image plane.

7. The apparatus of claim 6, wherein said drive means includes a bridge-type switching circuit for connecting said variable voltage power supply to said variable speed reversible motor.

8. In an autofocusing camera of the type having,
an image plane,
an adjustable focus lens mounted for displacement over a given operational range where it serves to focus images of subjects positioned within a range of subject distances at said image plane,
an ultrasonic rangefinder for deriving a subject distance signal representative of the distance to a particular subject within said range of subject distances,
means responsive to said subject distance signal for deriving a lens movement signal representative of the lens displacement necessary to displace said lens from a present position to one selected in accordance with said subject distance signal so as to focus an image of said particular subject at said image plane, the improvement comprising:
energizable drive means for displacing said lens an amount in correspondence with said lens movement signal at one rate in a particular direction while the magnitude of said lens movement signal is less than or equal to a signal corresponding to one-eighth of the entire focusing range of said adjustable focus lens and at another rate in said same particular direction while said magnitude of said lens movement signal is greater than said predetermined magnitude.

9. The apparatus of claim 8, wherein said lens is displaced to a focus position at a greater rate of speed when the magnitude of said lens movement signal is greater than said predetermined magnitude than it is displaced when said lens movement signal is equal to or less than said predetermined magnitude.

10. The apparatus of claim 9, wherein said greater rate of speed is twice that of the other rate of speed.

11. The apparatus of claim 8, wherein said energizable drive means includes a reversible variable speed motor for displacing said lens to a desired focus position.

12. The apparatus of claim 11, wherein said drive means includes a variable voltage power supply whose output voltage is variable between two voltage levels, the particular voltage level being dependent upon the magnitude of lens displacement necessary to focus an image of said particular subject at said image plane.

13. The apparatus of claim 12, wherein said drive means includes a bridge-type switching circuit for connecting said variable voltage power supply to said variable speed reversible motor.

14. The apparatus of claim 13, wherein said switching circuit utilizes solid state switching devices.

* * * * *